(12) United States Patent
Dusmez

(10) Patent No.: US 10,381,915 B1
(45) Date of Patent: Aug. 13, 2019

(54) VARIABLE DELAY FOR SOFT SWITCHING IN POWER CONVERSION CIRCUIT

(71) Applicant: TEXAS INSTRUMENTS INCORPORATED, Dallas, TX (US)

(72) Inventor: Serkan Dusmez, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/152,206

(22) Filed: Oct. 4, 2018

(51) Int. Cl.
| | |
|---|---|
| *H02M 1/08* | (2006.01) |
| *H02M 7/217* | (2006.01) |
| *H02M 1/42* | (2007.01) |
| *H02M 1/00* | (2006.01) |
| *H02M 7/219* | (2006.01) |
| *H02M 7/162* | (2006.01) |

(52) U.S. Cl.
CPC ......... *H02M 1/083* (2013.01); *H02M 1/4208* (2013.01); *H02M 7/217* (2013.01); *H02M 7/1623* (2013.01); *H02M 7/219* (2013.01); *H02M 2001/0009* (2013.01); *H02M 2001/0058* (2013.01)

(58) Field of Classification Search
CPC ..... H02M 1/083; H02M 7/1623; H02M 7/219
USPC .......................... 363/76, 78, 79, 88, 89, 127
See application file for complete search history.

(56) References Cited

U.S. PATENT DOCUMENTS

| | | | | |
|---|---|---|---|---|
| 6,570,366 | B1 * | 5/2003 | Lin ..................... | H02M 1/4208 323/207 |
| 2012/0212986 | A1 * | 8/2012 | Minami .............. | H02M 1/4208 363/126 |
| 2014/0071724 | A1 * | 3/2014 | Chiba ................. | H02M 7/2173 363/89 |
| 2016/0241132 | A1 * | 8/2016 | Lin ..................... | H02M 1/4225 |
| 2017/0005565 | A1 * | 1/2017 | Bai .................... | H02M 3/33507 |

* cited by examiner

*Primary Examiner* — Gary A Nash
(74) *Attorney, Agent, or Firm* — Tuenlap Chan; Charles A. Brill; Frank D. Cimino

(57) ABSTRACT

In some examples, a device comprises a power conversion circuit that includes: an inductor having a first end coupled to an input voltage terminal; a first switch coupled to a second end of the inductor at a first node; a second switch coupled to the second end of the inductor and the first switch at the first node; a third switch coupled to the first switch and to another input voltage terminal at a second node; and a fourth switch coupled to the second switch and to the another input voltage terminal at the second node. The device also comprises a control circuit comprising a variable delay circuit coupled to the first and second switches; and a controller coupled to the variable delay circuit, to an inductor current sensor, and to an input voltage sensor, the inductor current sensor coupled to the inductor and the input voltage sensor coupled to the input voltage terminal and the another input voltage terminal.

20 Claims, 7 Drawing Sheets

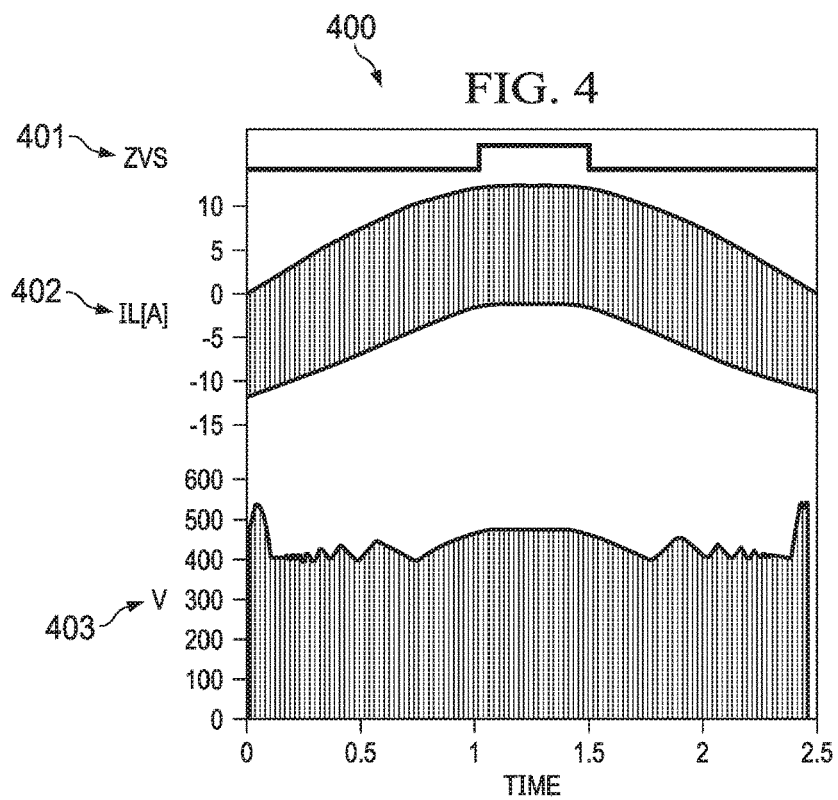

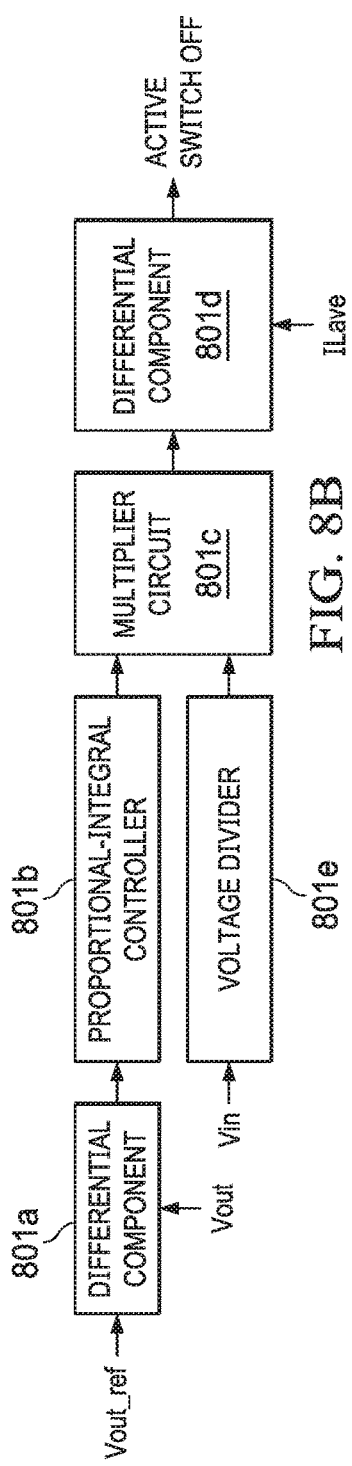
FIG. 8B
FIG. 8C
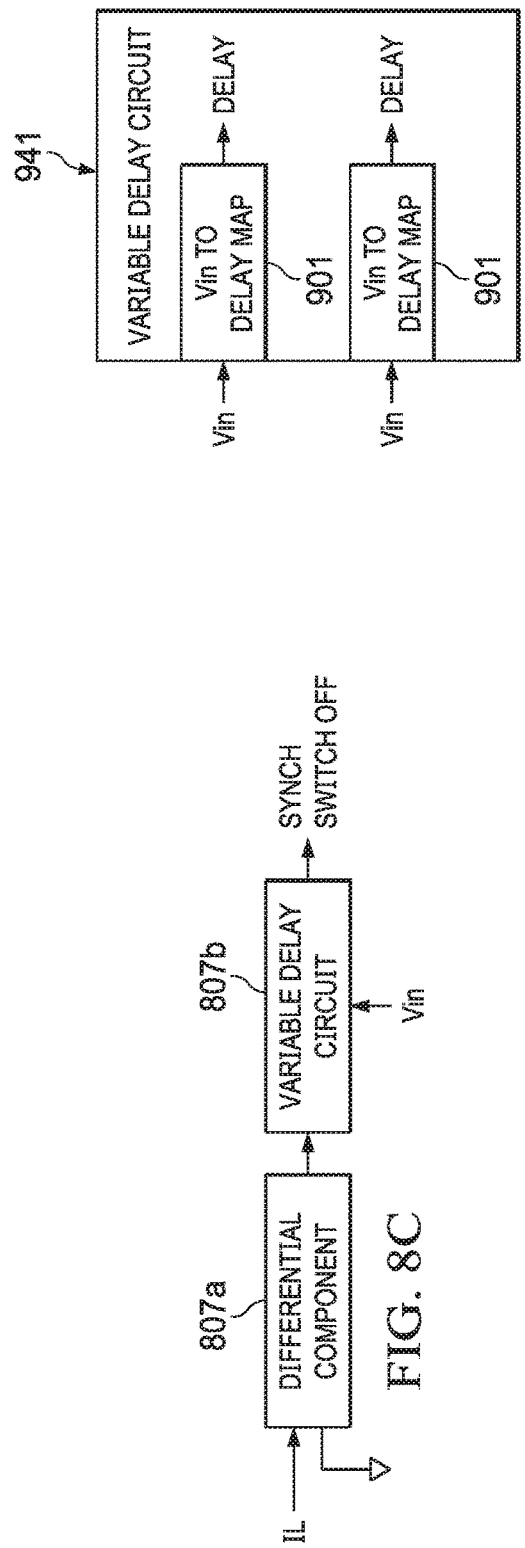
FIG. 9

VARIABLE DELAY FOR SOFT SWITCHING IN POWER CONVERSION CIRCUIT

SUMMARY

In some examples, a device comprises a power conversion circuit that includes: an inductor having a first end coupled to an input voltage terminal; a first switch coupled to a second end of the inductor at a first node; a second switch coupled to the second end of the inductor and the first switch at the first node; a third switch coupled to the first switch and to another input voltage terminal at a second node; and a fourth switch coupled to the second switch and to the another input voltage terminal at the second node. The device also comprises a control circuit comprising a variable delay circuit coupled to the first and second switches; and a controller coupled to the variable delay circuit, to an inductor current sensor, and to an input voltage sensor, the inductor current sensor coupled to the inductor and the input voltage sensor coupled to the input voltage terminal and the another input voltage terminal.

In some examples, a system comprises a controller configured to: receive measurements of current flowing through an inductor, the inductor included in a power conversion circuit having a critical conduction mode (CrM) Totem Pole power factor correction (PFC) topology; determine, based on the received measurements, that the current has reached approximately zero amps; switch off a first switch of the power conversion circuit in response to the elapsing of a variable delay after the determination, the first switch acting as a synchronous rectifier; and switch on a second switch of the power conversion circuit, the second switch acting as an active switch.

In some examples, a method comprises: determining, at a controller, that current through an inductor has reached approximately zero amps, the inductor included in a power conversion circuit having a critical conduction mode (CrM) Totem Pole Power Factor Correction (PFC) topology; waiting for a variable delay after the determination; after the variable delay has elapsed, switching off a first switch of the power conversion circuit, the first switch acting as a synchronous rectifier; and after switching off the first switch, switching on a second switch of the power conversion circuit, the second switch acting as an active switch.

BRIEF DESCRIPTION OF THE DRAWINGS

For a detailed description of various examples, reference will now be made to the accompanying drawings in which:

FIG. 4 is a graph of example conversion circuit operating conditions with a fixed delay-time between zero-current detection (ZCD) and synchronous synch switch turn-off;

FIG. 5 is a schematic diagram of an example controller configured to operate a conversion circuit with variable synch switch delay;

FIGS. 8B and 8C depict examples of control circuitry usable to achieve some of the states of FIG. 8A;

FIG. 9 is a schematic diagram of an example digital delay circuit;

DETAILED DESCRIPTION

Figure 1:
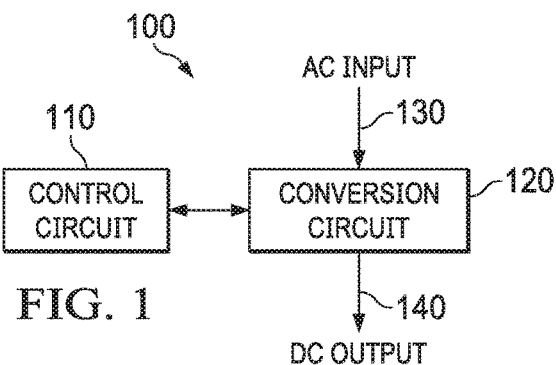
FIG. 1 is a schematic diagram of an example alternating current (AC) to direct current (DC) converter circuit.

Power conversion is the process of converting electric energy from one form to another, such as converting an alternating current (AC) signal into a direct current (DC) signal. Power conversion may also include changing the voltage and/or frequency of an electric signal. Many semiconductor-based power converters employ hard switching. Hard switching occurs when a switch is operated while voltage is applied and/or current is flowing across a semiconductor device. Without mitigating structures, hard switching undesirably results in power loss.

Soft switching is a switching scheme that occurs in the absence of a voltage (or current flow) across the switch. Soft-switched devices, while more complex than hard-switched devices, benefit from lower power losses when switches are engaged. Zero voltage switching (ZVS) is a soft switching technique that engages a switch when the voltage across the switch is at or near zero, thereby reducing the power losses typical of hard switching converters. A critical conduction mode (CrM) Totem Pole Power Factor Correction (PFC) is an example converter topology that implements ZVS. This disclosure describes the principles of operation of the CrM Totem Pole PFC topology, and it then explains how, in certain operating conditions, power conversion circuits implementing the CrM Totem Pole PFC cease to soft-switch and undesirably begin to hard-switch. Mechanisms to control conversion circuits implementing CrM Totem Pole PFC topology to maintain ZVS functionality over a broad range of operation conditions are then described with respect to the drawings.

The CrM Totem Pole PFC acts as a pair of boost converters. A boost converter includes an inductor that receives current and stores energy in an inductor magnetic field when a switch is closed. The switch is then opened, which forces charge from the inductor magnetic field onto an output load through the other power device(s). A boost converter thus has two states: an inductor charging state and an inductor discharging state, depending on the state of the switch. The CrM Totem Pole PFC creates boost converters whose functionalities change depending on switch state and on the polarity of incoming AC voltage. These boost converters are referred to herein as positive and negative boost converters.

Accordingly, the CrM Totem Pole PFC has four states: an inductor charge state with a positive current, an inductor discharge state with a positive current, an inductor charge state with a negative current, and an inductor discharge state with a negative current. The CrM Totem Pole PFC includes four switches to create these four states. Two of these switches are in a slow switching leg of the CrM Totem Pole PFC conversion circuit, and two of the switches are in a fast switching leg. The slow switching leg switches toggle when the input AC voltage changes from positive polarity to negative polarity and vice versa. This provides the positive boost converter or the negative boost converter functionality, depending on the state of the slow switching leg. The switches of the slow switching leg are referred to herein as PFC switches for purposes of clarity. The switches of the fast switching leg are referred to herein as control switches for purposes of clarity. The fast switching leg switches toggle to charge and discharge the inductor for each polarity of the input AC voltage. Depending on the polarity of the input AC voltage, one control switch acts as an active switch, meaning that it passes current through the inductor for charging. The other control switch acts as a synchronous rectifier, also known as a synch switch. The synch switch blocks current from returning to the inductor when the inductor is at charging state and forwards current to the output load when the inductor is at discharging state.

A dead-time is inserted between toggling the active switch off and the synch switch on, and vice versa. During the dead-time, both the active switch and the synch switch are off. This prevents shoot-through, which is an unintended, simultaneous conduction via both switches. ZVS can be achieved for the synch switch when sufficient dead-time is employed prior to toggling the synch switch on and off. ZVS can be achieved for the active switch by discharging a parasitic capacitance associated with a switch node prior to turning on the active switch. Discharging such capacitance can be accomplished by allowing current in the inductor to flow in a reverse direction. This occurs until sufficient energy is stored to discharge the parasitic capacitance of the switch node during the dead-time. Insufficient energy storage and/or short dead-times prevent ZVS, which results in hard switching. Hard switching causes voltage spikes leading to unreliable operation and high power loss. Accordingly, the synch switch is turned off after the inductor current reverses and becomes negative. During the interval between synch switch turn off and active switch turn on, the energy stored in the inductor discharges the switch node parasitic capacitance mentioned above and facilitates ZVS turn-on for the active switch.

The CrM Totem Pole PFC converter also includes a control circuit that activates and deactivates the switches described above. The decision to turn off the active switch is initiated based on the peak current or the average current through the inductor. Generally, the controller begins to turn on the active switch when current through the inductor reaches about zero. However, for ZVS operation, a few amps of negative current are employed. The value of such negative current is dependent on the dead-time and parasitic capacitance of the switch node. Accordingly, the dead-time between turning off the active switch and turning on the synch switch, the amplitude of the negative inductor current, or both can be adjusted to achieve ZVS conditions for a full operating range.

Controlling the negative current amplitude or adjusting the dead-time in a closed loop system is difficult for high-frequency switching operations. This is because the synch switch turn-off and active switch turn-on are triggered when the inductor current crosses zero, and hence should be completed rapidly for high frequency switching. An example control scheme involves turning the synch switch off after a fixed delay beginning after a zero current crossing signal is received. Hence, this approach employs a constant dead-time. However, this approach may also result in the creation of excessive negative current when the input AC voltage is near zero, which in turn causes excessive conduction losses. Further, this approach may result in insufficient negative current to achieve ZVS in cases when the input AC voltage is near a peak value. This is because a higher input AC voltage decreases the voltage applied to the inductor and results in a lower inductor current change over time (di/dt). Further, a lower negative peak current through the inductor may result from a lower current di/dt occurring when a constant delay is employed. Lower negative current results in storing less energy in the inductor. As noted above, insufficient energy stored in the inductor fails to discharge the parasitic capacitances, and hence causes hard-switching of the active switch.

Accordingly, disclosed herein are mechanisms to control converters implementing the CrM Totem Pole PFC topology to maintain ZVS (e.g., soft switching) functionality over a broad range of operating conditions. Specifically, to prevent hard switching, a control circuit controlling the converter is configured to provide a variable delay-time between the time when the inductor current reaches zero and when a synch switch is turned off. The control mechanism adopts a constant dead-time between the time when the synch switch is turned off and the time that the active switch is turned on. The control circuit determines the timing of such switching (and, thus, the length of the delay-time) based on both the input voltage received by the converter and the zero-crossing of the inductor current. The control circuit initiates the delay-time when inductor current crosses zero from positive to negative by monitoring a current flowing through the inductor in the converter. The control circuit then ends the delay-time by turning off the synch switch based on the AC input voltage information. The generated delay is proportional to the AC input voltage, which allows sufficient energy to be stored in the inductor to discharge the switch node parasitic capacitance during the constant dead time. The delay is proportional to the input AC voltage because the current di/dt is highest when AC voltage is equal to zero, and lowest during peak AC voltage. Accordingly, less delay time is employed when the input AC voltage is equal to zero, and more delay time is employed when the input AC voltage is at or near the peak in order to fully soft-switch the active switch. This ensures that the voltage drop across the active switch is zero when the active switch turns on, which enables ZVS. Hence, the amount of delay time is a function of input voltage detected in a feed-forward manner. (The term "feed-forward" indicates that a control system acts in a predefined manner in response to an input, in this case the converter input voltage, rather than in response to changes in the load, in this case the converter output.)

Moreover, the disclosed control scheme facilitates full ZVS operation even under various input voltages, e.g., universal input voltage supplies where input voltage is between 85 Volts AC (VAC) to 265 VAC. This is due to the fact that the delay time follows the input voltage, and less delay time is employed when input AC voltage is 85 VAC, since the current di/dt is proportional to the voltage difference between output voltage and input AC voltage when the synch switch is on. At the end of the fixed dead-time, the active switch is turned on to perform power conversion. This control mechanism enables the active switch of the CrM Totem Pole PFC converter to continually achieve ZVS (e.g., soft switching), and hence mitigates power losses related to hard switching behavior.

The proposed approach improves on gallium nitride (GaN) applications because it enables a relatively easy way to control power conversion in high-frequency converters having CrM Totem Pole PFC topologies. Further, it facilitates efficient power conversion in high-frequency converters with such topologies. Such converters are presently only possible with GaN. High frequencies can be 1 MHz or more with GaN, which significantly improves power density while maintaining high efficiency. In addition to facilitating such high frequencies, the proposed approach reduces circulating current in high frequency applications.

Referring now to FIG. 1, a schematic diagram of an example AC to DC converter circuit 100 is shown. The AC to DC converter circuit 100, sometimes referred to as an A/D converter, includes a power conversion circuit 120 (using a CrM Totem Pole PFC topology) with an AC input 130 and a DC output 140. The operation of the power conversion circuit 120 is controlled by a control circuit 110. The AC input 130 comprises AC power, such as mains electricity. The power conversion circuit 120 converts the AC power to DC power as discussed in greater detail below. The DC power, as the DC output 140, is then forwarded to a DC circuit for use. The AC to DC converter circuit 100 is implemented in any suitable electronic device that requires conversion from AC power to DC power. In some examples, the AC to DC converter circuit 100 is implemented on a single integrated circuit (IC). In some examples, the circuit 100 is distributed across multiple ICs. In some examples, the circuit 100 is distributed across multiple ICs within a single package, and in some examples, the circuit 100 is distributed across multiple ICs in different packages. Any and all such implementation variations are contemplated and included within the scope of this disclosure.

The power conversion circuit (or simply, conversion circuit) 120 employs active switching, for example using transistors, to perform AC to DC conversion. The control circuit 110 is any circuit configured to operate the switches of the conversion circuit 120 in the manner described herein. For example, the control circuit 110 is implemented in a digital signal processor (DSP) in some examples. In other examples, the control circuit 110 is implemented as a group of discrete analog components. Illustrative control circuits 110 are described below.

Figure 2:
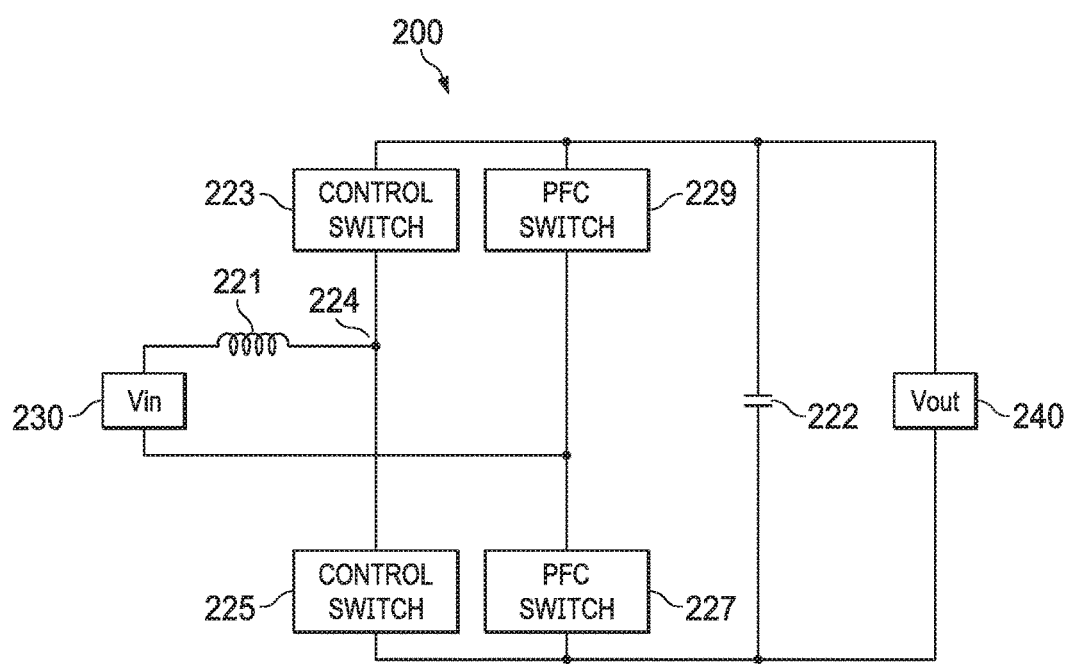
FIG. 2 is a schematic diagram of an example conversion circuit.

Referring now to FIG. 2, a schematic diagram of an example conversion circuit 200 using a CrM Totem Pole PFC topology is shown. The conversion circuit 200 is illustrative of the conversion circuit 120 depicted in FIG. 1. The circuit 200 is shown in block diagram form to indicate the variety of components that are usable to implement the circuit 200—for example, various types of transistors can be used for the control and PFC switches. The conversion circuit 200 includes a voltage input (Vin) 230, which is illustrative of AC input 130, and a voltage output (Vout) 240, which is illustrative of DC output 140. The conversion circuit 200 further comprises an inductor 221, control switches 223 and 225, switches (sometimes called PFC switches herein) 227 and 229, and a capacitor 222. The inductor 221 stores and releases energy over time to maintain a relatively consistent DC output voltage, while the control switches 223 and 225 and PFC switches 227 and 229 change state to apply the voltage/current from Vin 230 onto Vout 240 in the same direction regardless of Vin 230 polarity. This results in a DC signal at Vout 240.

The control switches 223 and 225 include transistors (e.g., silicon metal oxide semiconductor field effect transistors (MOSFETs) or gallium nitride field effect transistors (GAN FETs)), which have parasitic capacitances across drain-source terminals. In some examples, the PFC switches 227 and 229 include transistors (e.g., MOSFETs or GAN FETs), and in other examples, these switches include diodes. In some examples, the capacitor 222 comprises a capacitance to maintain voltage across a load and to filter any output voltage ripple. The control switches 223 and 225 together form a control leg of switches, and the PFC switches 227 and 229 together form a PFC leg of switches. Each of the switches 223, 225, 227, and 229 is controlled by the control circuit 110. In an example, the control circuit 110 produces gate driver signals to control each individual switch consistent with the switching behavior described herein.

The PFC switches 227 and 229 are controlled by a control circuit (e.g., control circuit 110) in a complementary manner, meaning that they alternate switching positions depending on the polarity of Vin 230 with a dead-time in between switching. For example, when the Vin 230 is positive, the PFC switch 227 is on and PFC switch 229 is off. Further, when the Vin 230 is negative, the PFC switch 227 is off and PFC switch 229 is on. Hence, in some examples, the switches in the PFC leg of switches change state twice per cycle of Vin 230.

The inductor 221 couples to the control leg of switches, which includes the control switch 223 and control switch 225. Specifically, the inductor 221 couples to the control leg at a switch node 224. The control switches 223 and 225 switch states twice within a switching period. In general, hundreds of switching periods (e.g., 300 or more) occur in a single AC line cycle. Accordingly, the control leg including the control switches 223 and 225 is also referred to as the "fast leg" and the PFC leg including the PFC switches 227 and 229 is also referred to as the "slow leg."

The control switches 223 and 225 in the fast leg are controlled in a complementary manner and may alternate switching positions twice per switching period. The PFC switches 227 and 229 in the slow leg are also controlled in a complementary manner, but switch positions twice per AC signal period. Thus, when the AC signal applied via the inductor 221 is positive, the PFC switch 227 turns on and remains on for the duration of half of the AC line cycle, and the PFC switch 229 turns off and remains off for the duration of that half of the AC line cycle. The opposite occurs during the half of the AC line cycle when the AC signal applied via the inductor 221 is negative. Meanwhile, each of the control switches 223 and 225 toggles hundreds of times during each half of the AC line cycle to control the current of the inductor 221.

Each of the control switches 223 and 225 acts as either an active switch or a synch switch. For example, during the positive half cycle of the AC signal applied via the inductor 221, the control switch 225 is the active switch and the control switch 223 is the synch switch. For the negative half cycle of the AC signal, the control switch 223 is the active switch and the control switch 225 is the synch switch. When Vin 230 is positive and the active switch is turned on, Vin 230 is applied to inductor 221 and hence current builds up in the inductor 221. Based on the controller output, the active switch turns off after some period, and the synch switch turns on. During this interval, a voltage that is equal to the difference between Vin 230 and Vout 240 is applied to the inductor 221. The turn-off signal for the synch switch is initiated after the current of inductor 221 crosses about zero (e.g., and begins to flow in the opposite direction). A variable delay-time is employed between the occurrence of the inductor 221 current crossing zero and initiating the synch switch turn-off signal. During this variable delay-time, the inductor 221 current becomes negative. After the synch switch is turned off, a constant dead-time elapses. After the constant dead-time, the active switch is turned on and the operation described above restarts. During the constant dead-time, both switches in the control leg are off and the negative inductor current discharges the parasitic capacitance of the active switch, thereby facilitating ZVS operation.

Figure 3:
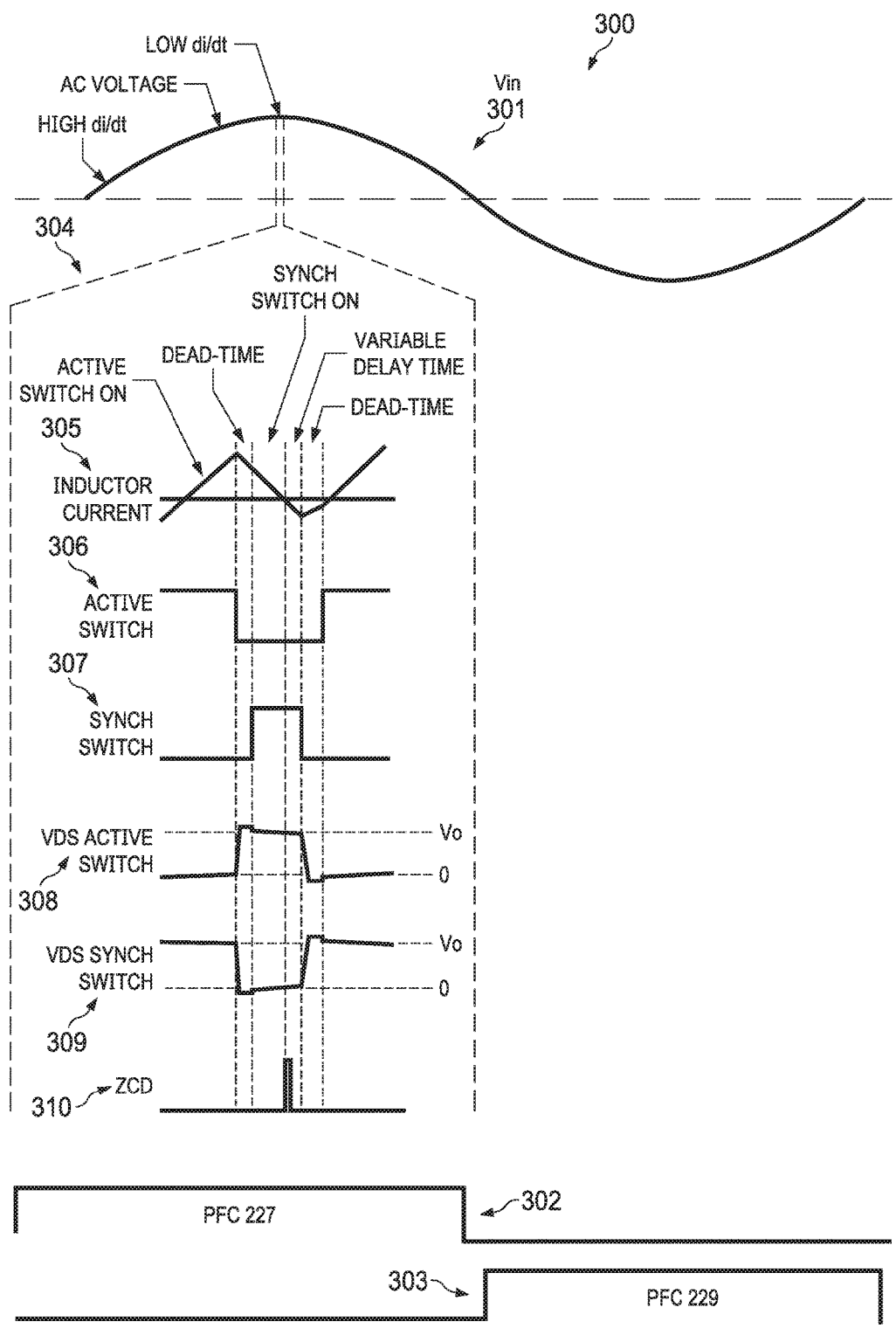
FIG. 3 is a graph of example signal values in a conversion circuit.

Reference is briefly made to FIG. 3, which includes a graph 300 of an example switch operation in a conversion circuit, such as conversion circuit 200. Graph 300 illustrates an AC cycle 301 of Vin 230. Waveforms 302 and 303 indicate states of the PFC switches 227 and 229. Specifically, a high value is illustrated to indicate a switch is on and a low value is illustrated to indicate a switch is off. As shown, PFC switch 227 switches on during the positive portion of the AC cycle 301 and switches off during the negative portion of the AC cycle 301. PFC switch 229 switches on during the negative portion of the AC cycle 301 and switches off during the positive portion of the AC cycle 301. Meanwhile, the control switches 223 and 225 toggle repeatedly during both portions of the AC cycle 301.

Referring to both FIGS. 2 and 3, during the positive portion of the AC cycle 301, control switch 223 acts as the synch switch, control switch 225 acts as the active switch, PFC switch 227 is on, and PFC switch 229 is off. When control switch 225 is on, current flows from Vin 230 across the inductor 221, through control switch 225 and PFC switch 227 and back to Vin 230. This results in charging the inductor 221 and creating a voltage drop across the inductor 221. After the control switch 225 switches off, control switch 223 switches on (e.g., after a constant dead-time). This causes the energy stored on the inductor 221 to be released to the output at Vout 240. The voltage drop across the inductor 221 is equal to the difference between Vin 230 and Vout 240. Specifically, current flows from Vin 230, through the inductor 221, across control switch 223, across Vout 240 (from positive terminal to negative terminal, assuming a load is coupled), across PFC switch 227, and back to Vin 230.

During the negative portion of the AC cycle 301, control switch 225 acts as the synch switch, control switch 223 acts as the active switch, PFC switch 227 is off, and PFC switch 229 is on. When control switch 223 is on, current flows from Vin 230 through PFC switch 229 and control switch 223, across the inductor 221 and back to Vin 230. This results in charging the inductor 221 and creating a voltage drop across the inductor 221. When the control switch 223 is switched off, control switch 225 switches on (e.g., after a constant dead-time). This causes the energy stored on the inductor 221 to be released to Vout 240. This creates a positive voltage drop across Vout 240 even when the voltage from Vin 230 is negative. Specifically, current flows from the inductor 221 through Vin 230, across PFC switch 229, across Vout 240 (assuming a load is coupled), across control switch 225, and back to the inductor 221. Using these techniques, an AC signal input is converted to a DC signal output.

The control leg and the PFC leg convert an AC power signal into a DC power signal as discussed above. The control leg and the PFC leg are switched so that Vout 240 is regulated at a constant DC positive value regardless of the polarity of the AC signal at Vin 230. Meanwhile, the current across the inductor 221 is actively controlled so that the average current value maintains a sinusoidal shape to achieve a high power factor and low total harmonic distortion. To fully maintain ZVS operation at the control switches 223 and 225, negative current builds up in the inductor 221 during synch switch on-time. When the synch switch is turned off, the negative current of the inductor discharges the switch node 224 capacitance fully and hence ensures a zero voltage switching condition for the active switch when the active switch is activated. In some examples, this inductor 221 current is at minimum when the AC line voltage is at a peak and at maximum when AC line voltage is at a minimum. Accordingly, a control scheme that employs a variable delay time for turning the synch switch off facilitates full ZVS (e.g., no hard switching on the control leg). This approach ensures that excessive conduction loss is avoided when the voltage at Vin 230 is low (e.g., near zero) by allowing for less synch switch on time. Further, greater synch switch on time is employed when the voltage at Vin 230 is near a peak, which facilitates ZVS operation at the active switch. The appropriate variable delay time, and hence the appropriate switching time, can be determined based on the current across the inductor 221 and/or voltage at Vin 230.

Referring again to FIG. 3, as shown, the AC cycle 301 results in a peak current (e.g., high di/dt) through the inductor when the voltage is near a midpoint and a minimum current (e.g., low di/dt) through the inductor when the voltage is near a positive (or negative) peak value. As mentioned above, waveforms 302 and 303 show operational characteristics for the PFC leg of the conversion circuit. Specifically, waveform 302 shows that the PFC switch 227 is on for the positive portion of AC cycle 301 and off for the negative portion of the AC cycle 301. Further, waveform 303 shows that the PFC switch 229 is off for the positive portion of AC cycle 301 and on for the negative portion of the AC cycle 301.

Graph 300 also shows a switch period 304 for the control leg. The switch period 304 is depicted using dashed lines. These dashed lines indicate that an entire switch period 304 for the control leg occurs repeatedly over short periods during the AC cycle 301. The switch period 304 operates according to an inductor current 305, an active switch 306, a synch switch 307, an active switch drain source voltage (VDS) 308, a synch switch VDS 309, and a zero current detection (ZCD) signal 310.

During the first portion of the switch period 304, the active switch 306 is switched on (depicted by a high value) and the synch switch 307 is off. This allows positive inductor current 305 to build up a charge on the inductor. The active switch 306 is then switched off to allow the inductor charge to be provided to the output. As shown, the active switch VDS 308 is at zero since the active switch pulls the switch node 224 to zero. The synch switch 307 remains off as well for a fixed dead-time. In the meantime, the inductor current 305 decreases towards zero as the inductor voltage is nearly equal to positive Vin. This causes the inductor current 305 to discharge the parasitic capacitance coupled to switch node 224 and causes the synch switch VDS 309 to drop to zero. The synch switch 307 is then activated while the synch switch VDS 309 is at or near zero in order to maintain ZVS. The synch switch 307 remains on and the inductor current 305 continues to drop. When the inductor current 305 reaches approximately zero, as indicated by ZCD signal 310, the controller introduces for a variable delay time before switching the synch switch 307 off. The variable delay time is selected based on the voltage at Vin at the corresponding portion of the AC cycle 301. The variable delay time allows the inductor current 305 to reverse direction and become negative. This provides negative charge to discharge parasitic capacitances at the switch node 224. At the end of the variable delay time, the synch switch 307 is switched off. The synch switch VDS 309 is at zero at this point, so ZVS is maintained. A fixed dead-time is then employed to allow the negative inductor current 305 to discharge the parasitic capacitances and to allow the active switch VDS 308 to return to zero. At this point, the active switch 306 is switched back on. The active switch VDS 308 is zero, so ZVS is maintained. The cycle then repeats as discussed above.

FIG. 4 shows a graph 400 of example conversion circuit operating conditions with a fixed delay-time between ZCD (e.g., ZCD 310) and synch switch turn-off. Such operation is in contrast to operation of conversion circuits 120, 200, which employ a variable delay time. Specifically, graph 400 shows voltage 403 of switch node 224 in volts, inductor current 402 in amps, and ZVS operation 401 of the conversion circuit, all as a function of time. A high signal in the ZVS operation 401 waveform indicates a non-ZVS operation. As shown, employing a fixed delay-time results in significant negative inductor current 402 (e.g., greater than negative ten amps), for example in cases when input AC voltage is at a minimum. Further, some cases result in the inductor current 402 being near zero when input AC voltage is at a maximum. When the negative inductor current drops below a certain point under constant dead-time (for example, when inductor current 402 rises above 10 amps), hard switching occurs since the energy stored in the inductor is not sufficient to discharge the parasitic capacitances and soft-switch the active switch. This results in a loss of ZVS operation 401. This is depicted as toggling of the ZVS operation 401 from low to high. Accordingly, fixed delay-time schemes may not operate efficiently due to excessive inductor current when input AC voltage is at a minimum. They may also operate inefficiently due to insufficient inductor current to soft-switch the active switch when input AC voltage is at a maximum. Further, adaptive dead-time schemes based solely on computation of inductor currents may be impractical to implement. Hence, the introduction of a variable delay time to switch off the synch switch (as in conversion circuits 120, 200) solves the issues shown in FIG. 4.

Referring now to FIG. 5, a schematic diagram of an example control circuit 500 configured to operate a conversion circuit, such as a CrM Totem Pole PFC, with variable delay time is shown. In some examples, control circuit 500 is employed to implement a control circuit 110 and/or to control a conversion circuit 200 according to graph 300. Specifically, the control circuit 500 is implemented in a system that includes a conversion circuit 520 (using a CrM Totem Pole PFC topology), which in some examples is substantially similar to conversion circuit 200. The control circuit 500 is designed to determine and apply a variable delay-time starting when the inductor current crosses zero in a downward (negative) direction. The control circuit 500 then turns off the synch switch in the conversion circuit after the variable delay time, which, as mentioned above and as described in detail below, is determined based on the input voltage. Specifically, the control circuit 500 is configured to receive a signal indicating the inductor current has reached zero. The control circuit 500 then provides a signal to switch the synch switch off after the variable delay-time. The control circuit 500 then switches an active switch on after a fixed dead-time. The control circuit 500 turns off the active switch when inductor current exceeds a reference inductor current, as described in greater detail below. The reference inductor current is generated to control and regulate the output voltage at a desired value. In some examples, the control circuit 500 regulates the peak or the average value of the inductor current to regulate the output voltage. In PFC conversion circuits, such as conversion circuit 520, the amplitude of the reference current is determined by an output voltage compensation loop. The reference inductor current waveform can be obtained from the input AC voltage. The angle can be employed to obtain unity power factor operation.

The control circuit 500 includes an inductor current sensor 526 that is electrically coupled to the inductor within the conversion circuit 520. The current sensor 526 is configured to sense the current passing through the inductor. The control circuit 500 also includes an input voltage sensor 532. The input voltage sensor 532 is electrically coupled to the AC input of the conversion circuit 520, e.g., to the pins or nodes on which the input signal is provided. The input voltage sensor 532 is configured to sense the voltage at the AC input. The control circuit 500 also includes an output voltage sensor 534. The output voltage sensor 534 is electrically coupled to the voltage output of the conversion circuit 520, e.g., to the pins or nodes on which the output signal is provided. The output voltage sensor 534 is configured to sense the voltage output of the conversion circuit 520.

The control circuit 500 also includes a controller 543 including one or more inputs coupled to the input voltage sensor 532, the current sensor 526, and the output voltage sensor 534. Hence, the controller 543 receives data indicating the input voltage to the conversion circuit 520, the current through the inductor, and the output voltage of the conversion circuit 520. The controller 543 then causes the pulse width modulation (PWM) generator 513 to generate signals to turn the control switches of the conversion circuit 520 on and off based on this data. The controller 543 toggles the control switches of the conversion circuit 520 via the PWM generator 513 according to the switch period 304 discussed with respect to FIG. 3. For example, the controller 543 implements fixed dead-times between switching an active switch off and a synch switch on, and vice versa. A variable delay circuit 541, under direction of the controller 543, also applies a variable delay prior to switching the synch switch off. The variable delay is initiated by the controller 543 when the inductor current sensor 526 indicates the current across the inductor has dropped to zero; otherwise, if the inductor current is positive or rising as in FIG. 3, the variable delay is not applied. The controller 543 determines the length of the variable delay based on the voltage of the AC input as measured by the input voltage sensor 532. Further, the controller 543 switches off the active switch based on the output voltage of the conversion circuit 520, as measured by the output voltage sensor 534, and the current through the inductor, as measured by the inductor current sensor 526. The controller 543 may include comparators, a proportional-integral (PI) controller, a multiplier circuit, etc., to make such determinations. In examples, the controller 543 includes storage storing machine-readable code which, when executed by a processor within the controller 543, causes the processor to perform the actions attributed herein to the controller 543. Circuitry similar to that depicted in FIG. 5 is usable to control the PFC switches in the conversion circuit 520 in the manner described above. To control the PFC switches, the delay circuitry 541 may optionally be omitted.

Figure 6:
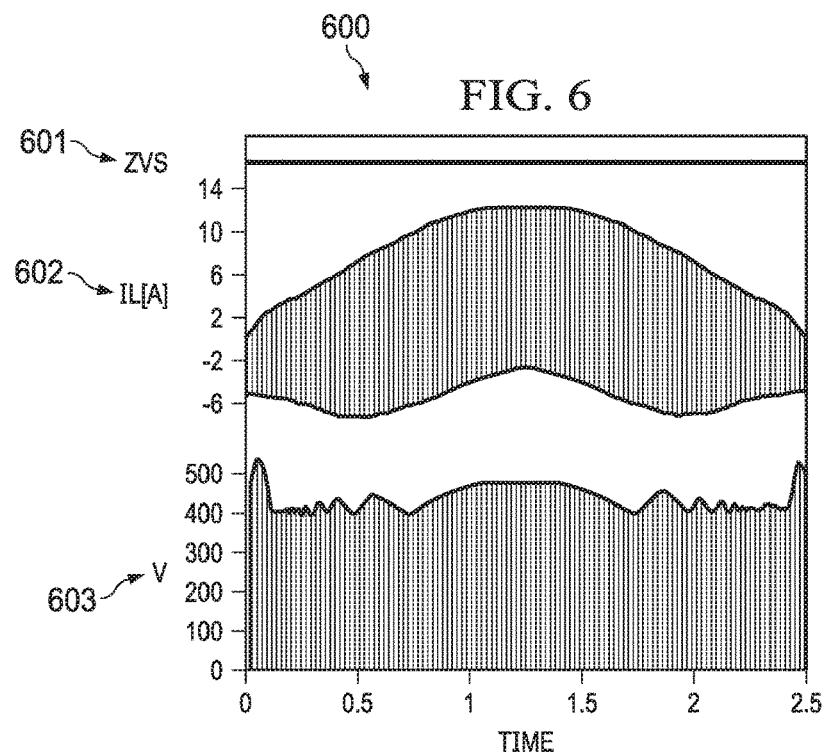
FIG. 6 is a graph of example conversion circuit operating conditions with a variable synch switch delay based on input voltage and inductor current.

Referring now to FIG. 6, a graph 600 of example conversion circuit operating conditions with a variable synch switch delay based on input voltage and inductor current is shown. For example, graph 600 shows voltage output 603 in volts, inductor current 602 in amps, and ZVS operation 601 of conversion circuit 200, as controlled by a control circuit 500, as a function of time. As shown, the voltage output 603 is similar to switch node voltage 403 (FIG. 4). However, the implementation of the control mechanisms disclosed herein reduces negative inductor current—for example, the negative inductor current 602 is reduced to about seven amps from the approximately negative thirteen amps of inductor current 402 in FIG. 4. Further, the lower bound negative inductor current 602 is maintained below zero, in this case about negative two amps. Accordingly, sufficient negative current is maintained across the inductor to support ZVS operation 601 across all operating conditions shown. This can also be observed from the ZVS logic signal 601 remaining low.

Figure 7:
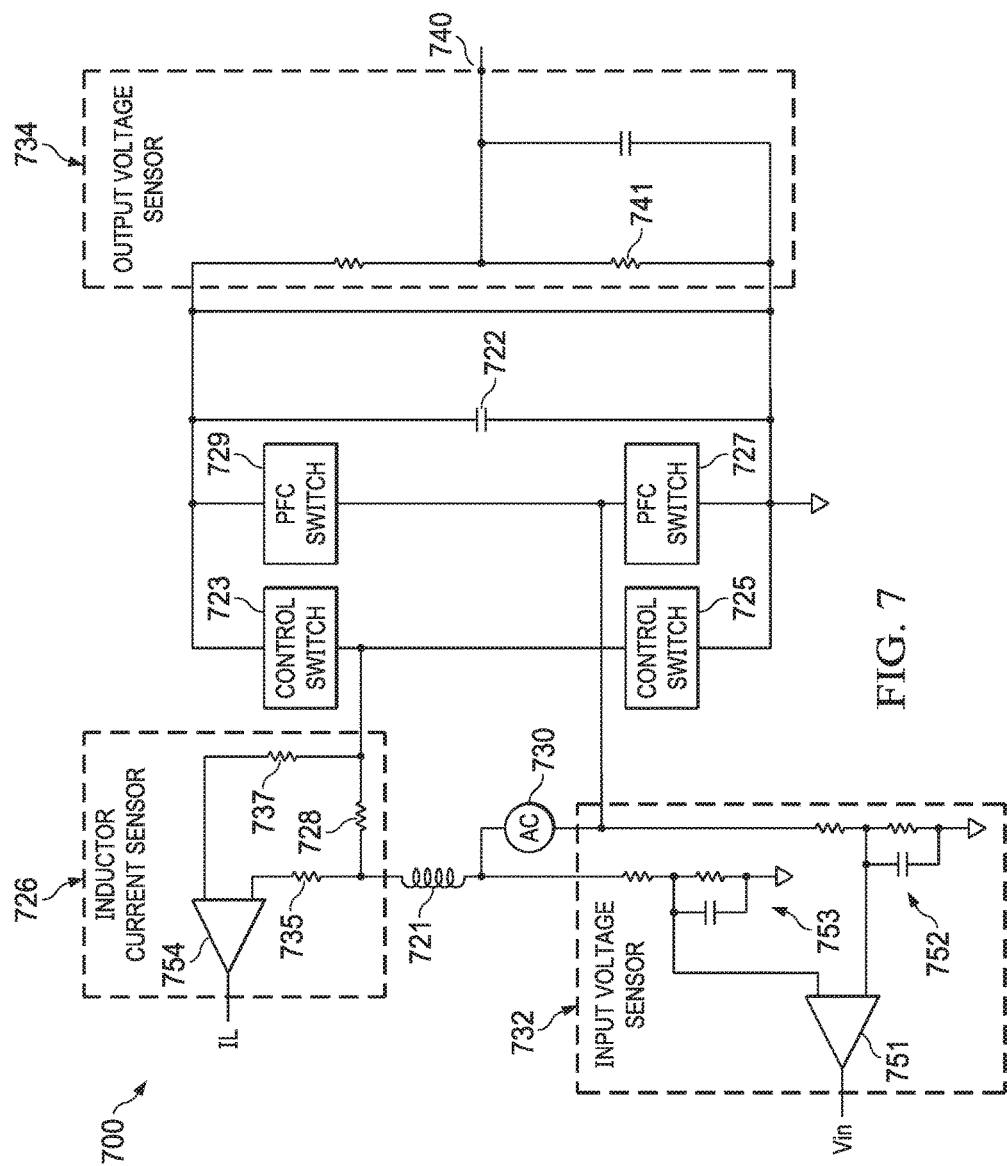
FIG. 7 is a schematic diagram of an example conversion circuit with multiple sensors for sensing inductor current and input and output voltage.

FIG. 7 is a schematic diagram of an example conversion circuit with multiple sensors for sensing inductor current and input and output voltage. Specifically, the sensors include an example inductor current sensor 726, an example output voltage sensor 734, and an example input voltage sensor 732. These are examples of the inductor current sensor 526, output voltage sensor 534, and input voltage sensor 532, respectively. The conversion circuit 700 includes a CrM Totem Pole PFC topology. Specifically, the conversion circuit 700 includes an AC input Vin 730, an inductor 721, a control switch 723, a control switch 725, a PFC switch 727, a PFC switch 729, a capacitor 722, and a measurement node 740, which are substantially similar to Vin 230, inductor 221, control switch 223, control switch 225, PFC switch 227, PFC switch 229, capacitor 222, and Vout 240, respectively, as depicted in FIG. 2 (and/or corresponding components in FIG. 5).

The input voltage sensor 732 includes a first filter 752 and a second filter 753 coupled to Vin 730. Each of the filters 752 and 753 includes an inline resistor coupled to the Vin 730 with a shunt resistor and a shunt capacitor in parallel. The inline resistors provide impedance to control the amount of current drawn by the input voltage sensor 732 and behave as voltage dividers to scale down their respective voltages and the shunt resistors and shunt capacitors filter their respective signals. The filters 752 and 753 couple each side of Vin 730 to an amplifier 751. The amplifier 751 then amplifies the difference between the voltages on its input terminals to output an analog signal indicative of the voltage drop across Vin 730, e.g., the value of Vin 730. The amplifier 751 can then provide its output to a controller, such as controller 543, in a control circuit, such as control circuit 500. In some examples, the output of the amplifier 751 couples to an analog-to-digital converter (ADC) that provides a digital representation of Vin 730 to the controller.

The output voltage sensor 734 is configured for a DC signal with some ripple. The output voltage sensor 734 includes a pair of resistors configured as a voltage divider. The voltage drop across resistor 741 can be measured at measurement node 740 to calculate Vout. In examples, the output voltage sensor 734 also includes a capacitor coupled in parallel to the resistor 741 to smooth the signal.

The inductor current sensor 726 includes a sensing resistor 728 coupled to the inductor 721. Current through the sensing resistor 728 is the same as current through the inductor 721. An amplifier 754 is coupled to each side of the sensing resistor 728 via a resistor 735, 737. The amplifier 754 measures the voltage drop across the sensing resistor 728. Current through the sensing resistor 728 can then be determined based on the measured voltage drop and the known resistance value of the sensing resistor 728. The measurements of amplifier 754 are output to, e.g., the controller 543 for computation of the current through the sensing resistor 728, and hence through the inductor 721.

Figure 8A:
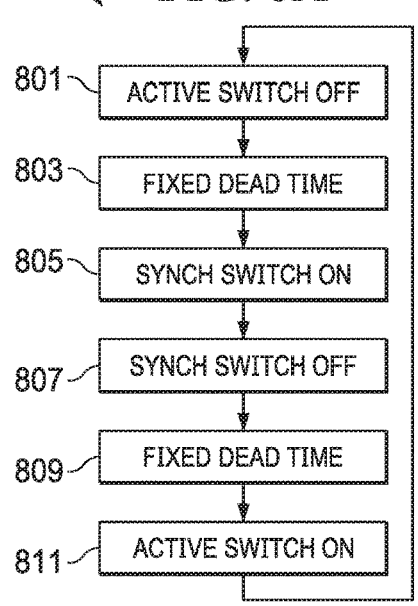
FIG. 8A is a flow chart of an example state machine for a control circuit operating a conversion circuit with a variable synch switch delay.

Referring now to FIG. 8A, a flow chart 800 of an example state machine for a control circuit, such as control circuit 500, operating a conversion circuit, such as a conversion circuit 120, 200, 520, and/or 700 with a variable synch switch delay is shown. The flow chart 800 is usable to complete switch periods, such as switch period 304, as discussed with respect to FIG. 3. The functional components shown in flow chart 800 can be implemented as hardware in the control circuit 500, as machine-readable code in the control circuit 500, or both.

The flow chart 800 assumes that the active switch is on and the synch switch is off prior to beginning execution of the flow chart 800. At 801, the control circuit determines to switch the active control switch off when the average current through the inductor (ILave) exceeds a reference current generated based on the input voltage of the conversion circuit, an output voltage of the conversion circuit, and a reference voltage. The control circuit can determine ILave using the inductor current measurements described above. As depicted in FIG. 8B, the control circuit includes a differential component 801a, such as an amplifier, that receives both the conversion circuit Vout and an output voltage reference Vout_ref. The control circuit also includes a proportional-integral (PI) controller 801b with an input coupled to the differential component 801a. The control circuit further includes a multiplier circuit 801c with inputs coupled to the PI controller and a voltage divider 801e. The control circuit further includes a differential component 801d, such as a comparator or an amplifier coupled to an ADC, with inputs coupled to the multiplier circuit 801c and the current sensor.

Still referring to FIG. 8B, the error between the output voltage reference Vout_ref and the measured output voltage Vout is provided to the PI controller 801b. The PI controller 801b generates an amplitude for the reference current. The voltage divider 801e divides the measured Vin by its maximal amplitude Vinmax to obtain a unity sinusoidal waveform reference which is in phase with the AC input voltage. The unity sinusoidal waveform reference is multiplied with the output of the PI controller 801b by the multiplier circuit 801c to provide a sinusoidal inductor current reference. The sinusoidal inductor current reference is then compared with ILave by the differential component 801d. When ILave is higher than the reference provided by the multiplier circuit 801c, a signal is generated to turn off the active switch. This allows the inductor current to be discharged to the output of the conversion circuit.

At 803, the synch switch and the active switch remain off for a fixed dead-time. The duration of the fixed dead-time is selected as desired and as necessary to achieve the functionality described herein. The fixed dead-time of 803 prevents shoot-through (e.g., conduction by both switches at once). Further, the fixed dead-time of 803 provides time for the voltage across the synch switch to drop to zero to support ZVS.

At 805, the sync control switch is switched on. At 807, the synch switch toggles off after a variable delay time as described above. As shown in FIG. 8C, for example, the control circuit includes a differential component 807a (e.g., amplifier, comparator) with inputs coupled to the current sensor and to ground. An output of the differential component 807a is coupled to an input of a variable delay circuit 807b. A variable delay circuit 807b input is also coupled to the input voltage sensor. A downward zero-crossing of the inductor current is achieved by comparing the measured inductor current from the current sensor with zero value (ground) by the differential component 807a. After the downward zero crossing is detected, a variable delay time is initiated by the variable delay circuit 807b. The variable delay time is a function of Vin as measured by the input voltage sensor. Hence, the variable delay circuit introduces a delay time to facilitate soft switching and to avoid excessive reverse current conduction before the synch switch is turned off. Specifically, the variable delay time allows the inductor current to reverse direction, become negative, and build up negative charge in the inductor. As described above, this provides negative charge to discharge parasitic capacitances at the switch node. At the end of the variable delay time, the control circuit toggles the synch switch off.

At 809, another fixed dead-time is implemented where both the active switch and the synch switch are off. This allows time for the negative inductor current to discharge the parasitic capacitances and allows voltage across the active switch to return to zero.

At 811, the active switch is switched back on while voltage across the active switch is zero. Hence, ZVS soft switching is maintained. The flow chart 800 then returns to 801 and the process repeats.

Referring now to FIG. 9, a schematic diagram of an example digital delay circuit 941 is shown. Specifically, digital delay circuit 941 may implement a variable delay circuit 541 and/or be employed at 807 in FIG. 8A (and FIG. 8C) to create a variable delay based on Vin. In examples, the digital delay circuit 941 is implemented on a DSP. The digital delay circuit 941 includes one or more Vin-to-delay maps 901, each of which may provide a different Vin-to-delay mapping, and each of which provides a delay that is a function of Vin. A Vin-to-delay map 901 correlates voltage input values to delay times and may take the form of, e.g., a data structure stored in memory. The Vin signal from the input voltage sensor is used to access the Vin-to-delay map 901 to determine the desired delay corresponding to that Vin at a specified point in the AC input cycle. In some examples, the digital delay circuit 941 is accessed and controlled by an external controller, such as the controller 543 in FIG. 5. In other examples, the digital delay circuit 941 includes a processor to access the Vin-to-delay maps 901 to apply the variable delays described herein.

Figure 10:
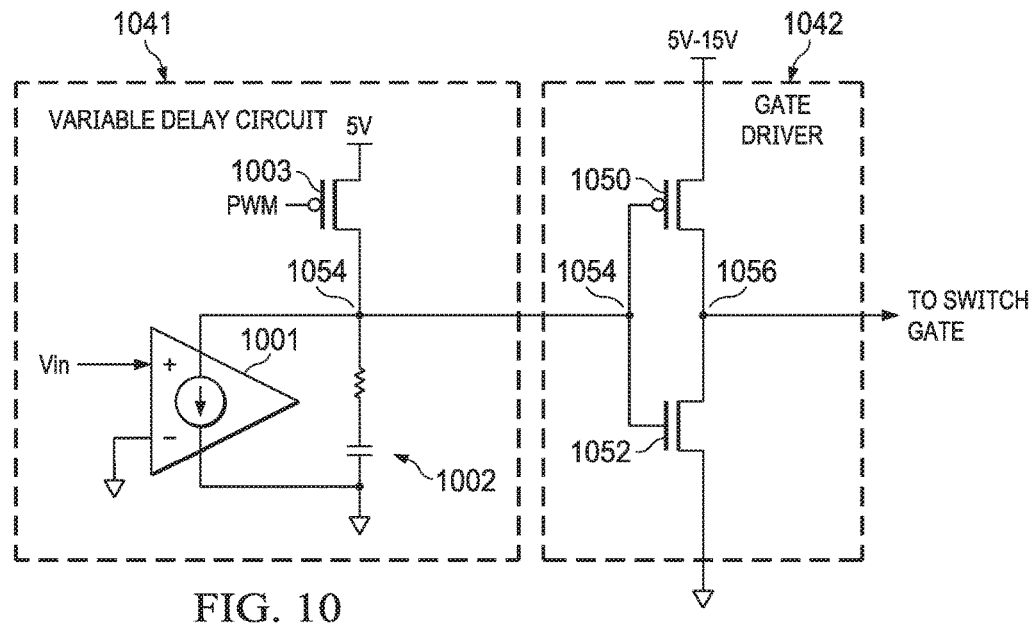
FIG. 10 is a schematic diagram of an example analog delay circuit.

Referring now to FIG. 10, a schematic diagram of an example analog delay circuit 1041 is shown. Specifically, analog delay circuit 1041 may implement a variable delay circuit 541 and/or be employed at 807 in FIG. 8A (and FIG. 8C) to apply a variable delay based on Vin after a ZCD event has occurred. The analog delay circuit 1041 may include a voltage-dependent current source 1001 with inputs to receive the input voltage via the input voltage sensor and to couple to ground. The current source 1001 may be implemented, for example, as a differential component (e.g., amplifier, comparator) that controls a switch (e.g., MOSFET). One non-control terminal of the switch is coupled to a gate driver 1042, which can be employed to switch off the synch switch. The other non-control terminal of the switch is coupled to ground. The switch couples in parallel with a resistor capacitor (RC) filter 1002. The delay circuit 1041 also includes a PWM switch 1003 (e.g., a p-type MOSFET) controlled by a PWM generator. The PWM switch 1003 couples to a voltage source (e.g., 5V). The gate driver 1042 comprises a switch 1050 (e.g., p-type MOSFET) coupled to a voltage source (e.g., 5V-15V) and to another switch 1052 (e.g., n-type MOSFET) that couples to ground. The gate terminals of the switches in the gate driver 1042 couple to each other and to the node 1054 between the filter 1002 and the PWM switch 1003. A node 1056 between the switches in the gate driver 1042 is the output of the gate driver 1042.

In operation, when the PWM signal goes low, the PWM switch 1003 turns on. In this state, the capacitor in the filter 1002 is charged. When the input node 1054 to the gate driver 1042 reaches a threshold, the p-MOSFET 1050 in the gate driver 1042 turns off and the n-MOSFET 1052 in the gate driver 1042 turns on. This causes the output node 1056 of the gate driver 1042 to go low. During this time when the PWM switch 1003 is on, the voltage input to the current source 1001 may introduce a delay to the switching of the switches in the gate driver 1042 by influencing the rate at which the capacitor in the filter 1002 charges. Specifically, when the differential between Vin and ground is sufficient to turn on the switch in the current source 1001, a low-resistance path to ground is provided from the voltage source, through the PWM switch 1003, and through the switch in the current source 1001. This reduces the rate at which the capacitor in filter 1002 charges, thereby introducing a delay time as described above. As Vin decreases, the channel through the switch in the current source 1001 also decreases, thus increasing the rate at which the capacitor in the filter 1002 charges and thereby altering the switching rate in the gate driver 1042. When the PWM signal is high, the PWM switch 1003 is off, the behavior of the current source 1001 is largely irrelevant, and the capacitor in the filter 1002 discharges to provide a voltage to the gate driver 1042 that turns on the n-MOSFET 1052 when it is sufficiently high and turns on the p-MOSFET 1050 when it is sufficiently low.

Figure 11:
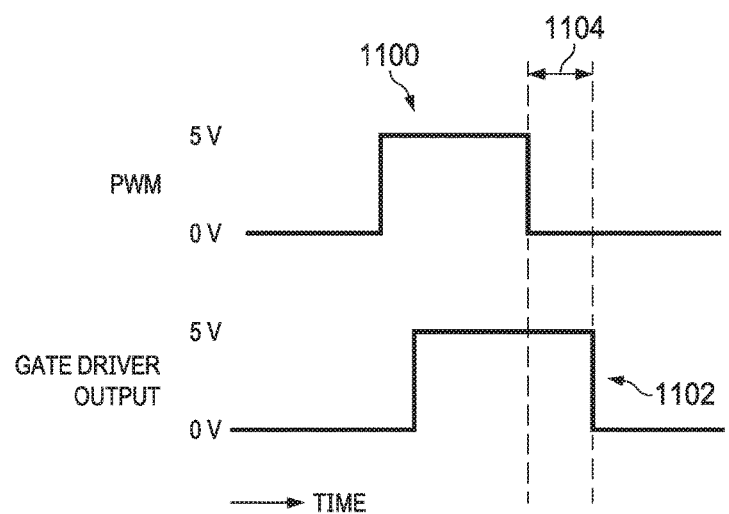
FIG. 11 is a graph of example waveforms associated with the analog delay circuit.

Referring now to FIG. 11, a graph of example waveforms 1100, 1102 associated with the analog delay circuit 1041 are shown. The waveform 1100 depicts the PWM signal provided to the gate of the PWM switch 1003, and the waveform 1102 depicts the voltage at the output node 1056 of the gate driver 1042. Time is on the x-axis and voltage is on the y-axis. The example waveform 1100 begins with the assumption that the PWM signal has been low sufficiently long so that the capacitor in the filter 1002 is fully charged. Because the capacitor is fully charged, the voltage provided to the gate driver 1042 by the delay circuit 1041 causes the p-MOSFET 1050 in the gate driver 1042 to be off and the n-MOSFET 1052 to be on, resulting in a logic low at the gate driver output node 1056. The PWM signal subsequently rises high, as waveform 1100 depicts. This does not result in an immediate change to the gate driver output in waveform 1102, because the capacitor in the filter 1002 first discharges for a period of time until the voltage supplied to the gate driver 1042 by the delay circuit 1041 is low enough to turn off the n-MOSFET 1052 and to turn on the p-MOSFET 1050 in the gate driver 1042. This causes the output 1056 of the gate driver 1042 to rise, as waveform 1102 shows. The PWM signal subsequently goes low, as waveform 1100 depicts. This causes the capacitor in the filter 1002 to charge again. However, the current source 1001 delays the charging of the capacitor by providing an alternate, low-resistance path for current flow. This causes a longer period of time to elapse (than would otherwise be the case) prior to the input voltage at node 1054 going sufficiently high so as to turn off the p-MOSFET 1050 and turn on the n-MOSFET 1052. Numeral 1104 in FIG. 11 indicates this time delay.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. The terms "approximately" and "about" mean within plus or minus 10% of the stated value, unless the stated value is zero, in which case the terms mean zero or within plus or minus one unit from zero (e.g., approximately zero volts would be between −1 V to +1 V, inclusive).

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A device comprising:
   a power conversion circuit including:
      an inductor having a first end coupled to an input voltage terminal;
      a first switch coupled to a second end of the inductor at a first node;
      a second switch coupled to the second end of the inductor and the first switch at the first node;
      a third switch coupled to the first switch and to another input voltage terminal at a second node; and
      a fourth switch coupled to the second switch and to the another input voltage terminal at the second node; and
   a control circuit comprising:
      a variable delay circuit coupled to the first and second switches; and
      a controller coupled to the variable delay circuit, to an inductor current sensor, and to an input voltage sensor, the inductor current sensor coupled to the inductor and the input voltage sensor coupled to the input voltage terminal and the another input voltage terminal.

2. The device of claim 1, wherein the power conversion circuit comprises an output voltage terminal coupled to the first and third switches and another output voltage terminal coupled to the second and fourth switches.

3. The device of claim 2, wherein the control circuit further comprises an output voltage sensor coupled to the controller, to the output voltage terminal, and to the another output voltage terminal.

4. The device of claim 2 wherein the control circuit further comprises a pulse width modulation (PWM) generator coupled to the variable delay circuit and to the controller.

5. The device of claim 2, wherein the controller includes a proportional-integral (PI) controller with an input coupled to a differential component, the differential component coupled to an output voltage sensor, the output voltage sensor coupled to the output voltage terminal and to the another output voltage terminal.

6. The device of claim 5, wherein the controller further includes a multiplier circuit coupled to the PI controller and to a voltage divider coupled to the input voltage sensor.

7. The device of claim 6, wherein the controller further includes another differential component coupled to the multiplier circuit and to the inductor current sensor.

8. The device of claim 1, wherein the controller includes a comparator coupled to the inductor current sensor, and wherein the variable delay circuit is coupled to the comparator and to the input voltage sensor.

9. The device of claim 1, wherein the controller is configured to implement a variable delay between a time that current flowing through the inductor drops to approximately zero and a time when the controller switches off one of the first and second switches.

10. A system comprising:
    a controller configured to:
       receive measurements of current flowing through an inductor, the inductor included in a power conversion circuit having a critical conduction mode (CrM) Totem Pole power factor correction (PFC) topology;
       determine, based on the received measurements, that the current has reached approximately zero amps;
       switch off a first switch of the power conversion circuit in response to the elapsing of a variable delay after the determination, the first switch acting as a synchronous rectifier; and
       switch on a second switch of the power conversion circuit, the second switch acting as an active switch.

11. The system of claim 10, wherein the variable delay is based on an input voltage provided to the power conversion circuit.

12. The system of claim 10, wherein the controller is configured to switch off the second switch in response to an average current through the inductor exceeding a reference current, the reference current based on an input voltage provided to the power conversion circuit and on an output voltage provided by the power conversion circuit.

13. The system of claim 12, wherein the controller is configured to wait for a fixed dead time between switching off the second switch and switching on the first switch.

14. The system of claim 10, wherein the system comprises a variable delay circuit, the variable delay circuit including a voltage-dependent current source having an input coupled to a power conversion circuit input voltage terminal and an output coupled to a gate driver for the first switch.

15. The system of claim 14, further comprising a p-type metal oxide semiconductor field effect transistor (MOSFET) coupled to the output of the voltage-dependent current source, a gate terminal of the p-MOSFET coupled to a pulse width modulation (PWM) generator.

16. A method comprising:
    determining, at a controller, that current through an inductor has reached approximately zero amps, the inductor included in a power conversion circuit having a critical conduction mode (CrM) Totem Pole Power Factor Correction (PFC) topology;
    waiting for a variable delay after the determination;
    after the variable delay has elapsed, switching off a first switch of the power conversion circuit, the first switch acting as a synchronous rectifier; and
    after switching off the first switch, switching on a second switch of the power conversion circuit, the second switch acting as an active switch.

17. The method of claim 16, further comprising determining the variable delay based on an input voltage provided to the power conversion circuit.

18. The method of claim 17, further comprising implementing the variable delay using a voltage-dependent current source and a capacitor.

19. The method of claim 16, further comprising switching off the second switch in response to an average current through the inductor exceeding a reference current, the reference current based on an input voltage to the power conversion circuit and on an output voltage provided by the power conversion circuit.

20. The method of claim 16, further comprising waiting for a fixed dead time between switching off the second switch and switching on the first switch.

* * * * *